United States Patent [19]

Yamazaki

[11] Patent Number: 4,845,695
[45] Date of Patent: Jul. 4, 1989

[54] OPTICAL DISK MEMORY SYSTEM UTILIZING A CHIRAL SMECTIC LIQUID CRYSTAL

[75] Inventor: Shunpei Yamazaki, Tokyo, Japan

[73] Assignee: Semiconductor Energy Laboratory Co., Ltd., Kanagawa, Japan

[21] Appl. No.: 108,992

[22] Filed: Oct. 8, 1987

Related U.S. Application Data

[62] Division of Ser. No. 874,100, Jun. 13, 1986, abandoned.

[30] Foreign Application Priority Data

Jun. 14, 1985 [JP] Japan ................... 60-130189
Jun. 14, 1985 [JP] Japan ................... 60-130190

[51] Int. Cl.⁴ .......................... G11B 7/24; G11B 9/02; G11B 11/12
[52] U.S. Cl. ...................................... 369/13; 365/108; 365/117
[58] Field of Search ............ 350/334, 335, 349, 350 S, 350/351, 340, 341, 330; 365/108, 117; 369/13, 100, 110, 111; 360/114

[56] References Cited

U.S. PATENT DOCUMENTS

| | | | |
|---|---|---|---|
| 3,988,056 | 10/1976 | Hareng et al. | 350/341 |
| 4,031,529 | 6/1977 | Borel et al. | 350/351 |
| 4,048,628 | 9/1977 | Boswell | 365/108 |
| 4,150,396 | 4/1979 | Hareng et al. | 350/351 |
| 4,240,712 | 12/1980 | Thirant | 350/351 |
| 4,261,650 | 4/1981 | Sprokel | 350/341 |
| 4,278,326 | 7/1981 | Kawamura et al. | 350/343 |
| 4,367,924 | 1/1983 | Clark et al. | 350/334 |
| 4,405,993 | 9/1983 | Kahn et al. | 365/108 |
| 4,585,310 | 4/1986 | Clecak et al. | 350/341 |
| 4,586,791 | 5/1986 | Isogai et al. | 350/341 |
| 4,606,613 | 8/1986 | Urabe | 350/351 |
| 4,622,654 | 11/1986 | Yanire et al. | 365/108 |
| 4,634,226 | 1/1987 | Isogai et al. | 350/332 |
| 4,634,228 | 6/1987 | Iwasaki et al. | 350/341 |
| 4,639,089 | 1/1987 | Okada et al. | 350/350 S |

Primary Examiner—Alan Faber
Assistant Examiner—Hoa T. Hguyen
Attorney, Agent, or Firm—Gerald J. Ferguson, Jr.

[57] ABSTRACT

An improved magneto-optical disc memory with a ferroelectric liquid crystal (FLC) is shown. As FLC a chiral smectic liquid crystal is employed to exhibit a hysteresis between a pair of substrates which have easy polarization axes normal to each other Informations to be recorded are written on the disc in terms of a binary system by use of the hysteresis.

3 Claims, 4 Drawing Sheets

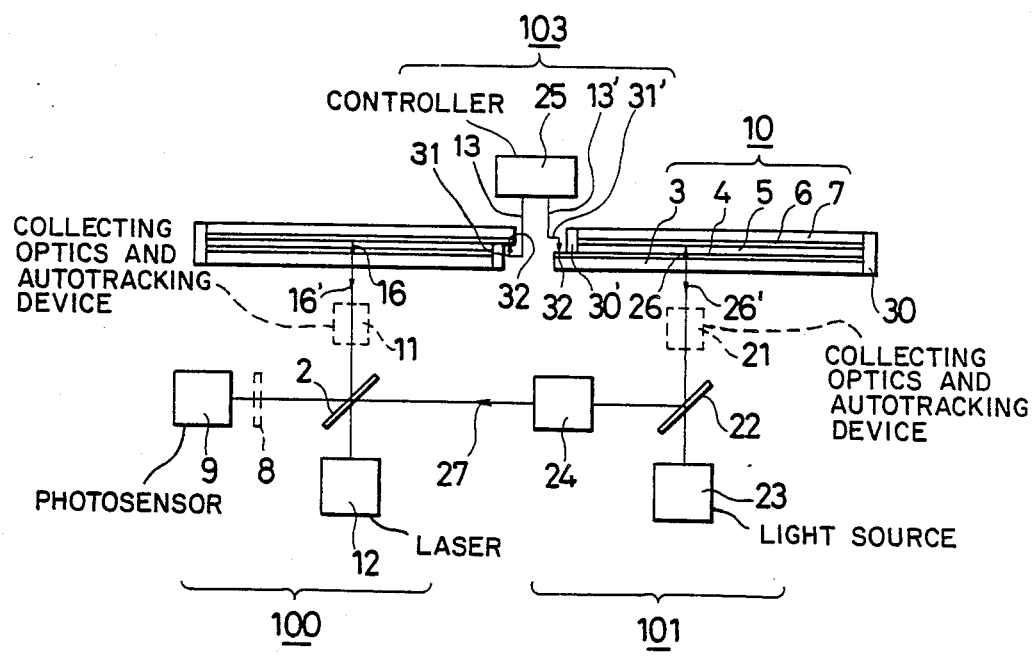

OPTICAL DISK MEMORY SYSTEM UTILIZING A CHIRAL SMECTIC LIQUID CRYSTAL

This is a divisional application of Ser. No. 874,100, filed 6/13/86.

BACKGROUND OF THE INVENTION

1. Field of the Invention

This invention relates to an optical disc memory which employs a liquid crystal made of optical molecules, possessing an electric dipole density.

2. Brief Description of Prior Art

As an optical disc device there is known a nonrewritable digital disc memory divice that utilizes the reflecting conditions of laser light from an uneven reflecting surface, as represented by the compact disc. This application is being considered that will become very promising in the future not only for audio and video uses but also for an optical disc memory for information processing. However, a disadvantages of the disc memory is that it is not possible to be rewritten. For this reason, systems that permit rewriting had been in demand, and as such a product there is known the magneto-optic memory device. In addition, there is also known an optical disc memory device of amorphous semiconductor type that employ a chalcogen series (tellurium series).

However, disc device that employ magneto-optic memory use rare materials and are extremely expensive so that people are apprehensive of their mass production in the future. Moreover, the light control for the method that employs chalcogen series amorphous semiconductor is extremely delicate.

Because of these, there have been sought means that possess such feature as the use of materials that can be mass produced, facility in turning on and off of light, possession of nonvolatility, and nonconsumption of external energy in storing the memory.

SUMMARY OF THE INVENTION

It is therefore an object of the invention to provide an optical disc memory with liquid crystal.

It is another object of the invention to provide an erasable and rewritable optical disc memory.

It is further object of the invention to provide an optical disc memory with which recording system can be simple and economic.

It is further object of the invention to provide an improved information recording system with high speed erasing and writing operations.

In order to accomplish the above and other objects and advantages, the inventor has employed a liquid crystal which exhibit a hysteresis in cooperation with means for giving to the liquid crystal a lagging in optical characteristics when external electric field is removed. With this hysteresis, a nonvolatile binary cell capable of being rewritten is prepared.

BRIEF DESCRIPTION OF THE DRAWINGS

FIG. 1 is a schematic illustration of a first embodiment of an optical disc memory in accordance with the invention.

PREFERRED EMBODIMENTS OF THE INVENTION

Figure 2A:
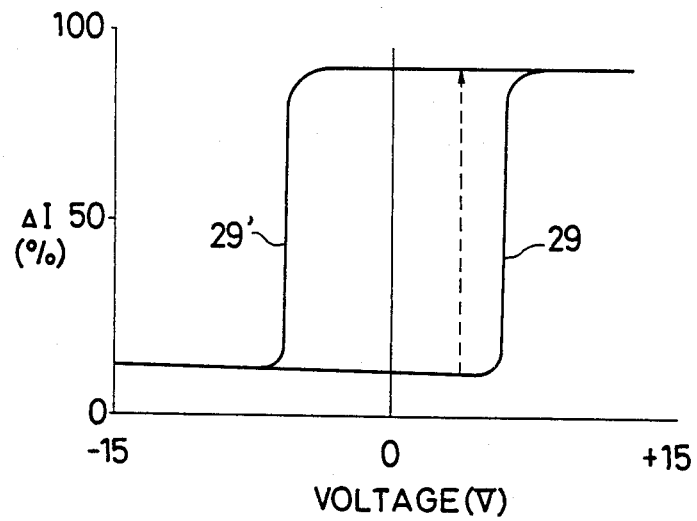
FIGS. 2(A) and 2(B) are light transmissivity versus voltage curves for the optical disc memory of the invention.

Referring to FIG. 1 an embodiment of the invention is shown.

A first system 100 is for "reading" information, a second system 101 is for "writing" information and a third system 103 is for "erasing" information. Reference 10 designates an optical disc.

The optical disc has two disc substrates 3 and 7 opposed to each other. At least one of the substrates, the substrate 3 in the figure, is light transmitting. On the insides of the two, there are provided electrodes 4 and 6 respectively. Here, the electrode 4 provided on the substrate 3 must be light transmitting and the electrode 6 on the substrate 7 must be reflective. Moreover, at least one of the substrates 3 and 7 is formed with the inside surface thereof having an orienting capability, as discussed below. The substrates 3 and 7 are separated from each other by a 4 $\mu$m distance with spacers (not shown). Between the substrates 3 and 7, a ferroelectric liquid crystal (FLC hereafter), such as smectic C*, is disposed. The disposing process is carried out with the hot liquid crystal in a smectic A phase. In so doing, the FLC molecules are aligned and formed into a plurality of molecular layers perpendicular to the substrates at room temperature, according to the oriented inner surface of the substrate, and get a stability.

The inner and outer peripheries of the optical disc are sealed off by sealing members 30 and 30' to shut out FLC from making contact with air. On the inner periphery side of the optical disc 10 there are provided contacts 32 and 32' that are formed extending from a pair of electrode 4 and 6 for applying voltage between the electrodes.

The optical disc will be described in more detail in the following:

Namely, for the substrate 7 use was made of plastic or corning 7059 glass. On this substrate there was formed a reflective electrode 6 of Alminium by vapor deposition in vacuum. The opposing electrode 4 was prepared by forming a light-transmitting conductive film on the transparent substrate 3 of plastic or glass. As the light transmitting conductive film use was made of ITO (indium-tin oxide). Then, on the inside of electrode 4, there are provided orienting film (not shown) of PAN (polyacryl-nitryl) and PVA (polyvinyl-alcohol) by spinning method to a thickness of 0.1 $\mu$. FLC 5, e.g. S8 (octyl-oxy-benzylidene-amyno-methyle-butyl-benzoate) of thickness 1.5 $\mu$, was sandwiched by the electrodes. A number of spacers are interposed between the pair of substrates to reinforce the disc memory.

To the inner surface a known rubbing treatment is given. For example, a cylinder covered with nylon film is rotated in a rubbing device at 900 RPM and the inner surface of the film to be oriented undergoes the treatment of the rubbing device by moving at a speed of 2 m/min. In this embodiment, DOBAMBC or a blending of a plurality of FLCs may also be used as FLC to be filled in the disc instead of S8. Some examples are shown by J. W. Goodby et al., "Ferroelectrics Switching in the Tilted Smectic Phase of R-C-3-4-n-Hexyloxydenzylidene 4'-Am'no-(2-Chloropropyl) (innamate(-HOBACPC))", Ferroelectrics 1984 Vol. 59 pp. 126–136, Japanese Patent Published Applications Nos. sho 59-98051 and 118744.

As an FLC confined in the disc, a chiral smectic C liquid crystal is used. Between the two substrates 3 and 7 FLC has a molecular structure composed of a plurality of laminated layers each perpendicular to the substrates 3 and 7. In each layer the molecules of the liquid crystal tend to be arranged in the same attitude having a ferroelectric polarization P (electric dipole moment) normal to the long axis of the liquid crystal molecule and laying on the layer. The long axes spontaneously make a certain tilt angle with the layer normal.

Figure 2B:
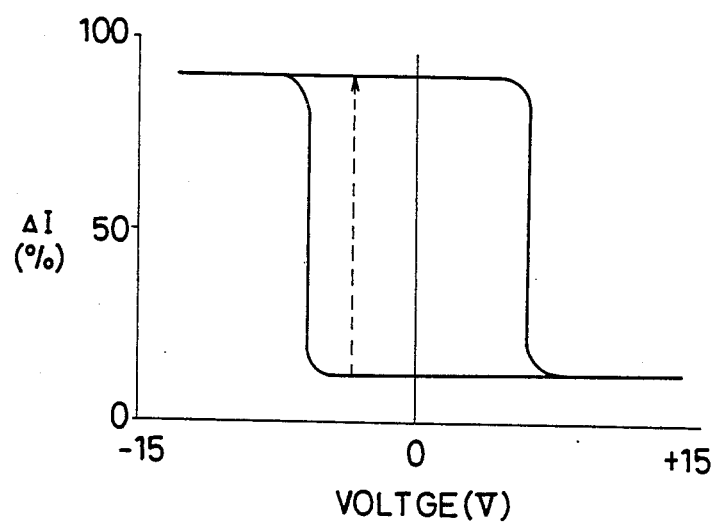

FIG. 2 (A) shows a light transmissivity versus a voltage across the liquid crystal in reference to duly polarized light incident on FLC between the substrates 3 and 7. By means of the contiguous surface of the substrate to FLC, FLC exhibits hysteresis. Namely when $+15V$ (or $3 \times 10^4 V/cm$) is applied between the electrodes, FLC appears transparent having the electric polarization (referred to as having the "up" dipoles hereinafter) so that the molecules of the liquid crystal are oriented parallel to the substrates at the above mentioned tilt angle, for example. On releasing application of the voltage, the transparency of FLC remains as it was. On the other hand, an application of reverse voltage, e.g. $-15$, transforms the condition of FLC into an opaque condition having the opposite electric polarization (the "down" dipoles, hereinafter) so that the molecules are re-oriented parallel to the substrates at an angle twice the tilt angle with respect to the layer normal.

This opaque condition can be observed even after the applied voltage is increased to a forward voltage providing the forward voltage is less than the coercive voltage Ec.

Having increased from $-15v$ to a certain forward level less than the coersive voltage Ec, the applied voltage becomes to favor the "up" dipole although FLC has yet held the "down" dipoles in virtue of the contiguous surfaces of the substrates. Some suitable external disturbance such as a light beam can inverse the dipoles of the molecules from "down" to "up" as shown in FIG. 2A with a broken line. In this embodiment, some domains of FLC are irradiated with light beam, especially of infrared ray, to be reversed selectively. In the following, the condition with the "up" dipole is referred to as "0" state and the condition with the "down" dipole as "1" state. FIG. 2 (B) shows the characteristics of FLC with respect to light incident thereon polarized on the plane of polarization normal to that of FIG. 2 (A).

Now the explanation of how information is written on or erased from the above described disc memory is in order.

In the erasing system 103 the electrodes for external contacts 32 and 32' are connected to the terminals 31 and 31' of the leads 13 and 13' that are taken out from a high voltage source 25 to carry out "erasing". A sufficient voltage is applied between the opposing electrodes 32 and 32' to arrange FLC molecules in one direction, referred to "0" state, entirely throughout the disc.

With this condition of the disc, "writing" of information will be carried out for the disc by the use of the system 101. Namely, "writing" is carried out by irradiating a prescribed address of FLC whose molecules are arranged in one direction throughout its surface, with a light beam 26 under application of weak voltage less than Vc. If wavelength is $1-3\mu$, FLC can absorb a large part of the light energy. The appropriate wavelength depends on the applied voltage. For example, 10V versus 1.2 $\mu m$ or 6V versus 2 $\mu m$ are suitable. In so doing, information is being recorded on the disc in terms of binary system.

The light beam 26 is radiated from a light source 23 through a half-mirror 22 and a system 21 such as a collecting optics and an autotracking device. After being reflected from the disc, the reflected light beam 26' further reaches a photosensor 9 via the mirror 22 and a light intensity controllor 24. That writing is in progress is monitored there.

Next reading process will be described. The light beam 26' from a semiconductor laser 12 impinges, after passing through a half-mirror 2 and a system 11 such as a collecting optics and an auto-tracking device, upon the optical disc 10 as a beam 16. Then, the light is reflected from the disc 10 as a beam 16', its path is split by the half-mirror 2, and reaches the light-receiving sensor 9 via a polarizing plate 8.

According to the sense of the liquid crystal on which the light is incident, the reflected light is polarized either on parallel plane or unparallel plane to the plane of polarization of the plate 8. Although, if the tilt angle of the liquid crystal is 45°, the light incident on the plate 8 has been polarized on parallel or normal plane to the polarizing plane of the plate 8, the polarization by the liquid crystal is occasionally not satisfactory because the liquid crystal, even with complete regular arrangement of molecules with the same attitude, is necessarily to polarize light wave completely. To enhance the polarizing power of such a liquid crystal, some additive is available so that the molecules of the additive are interposed and oriented between the molecules of the liquid crystal. The additive functions as a polarizer in cooperation with the liquid crystal while the liquid crystal determines the sense of attitude to be taken by molecules of itself and the additive. For example, as an additive, dichromatic substance such as anthraquinone dye or azo-compound are effective. The polarizing power is attributed to an absorption anisotropy.

Figure 3:
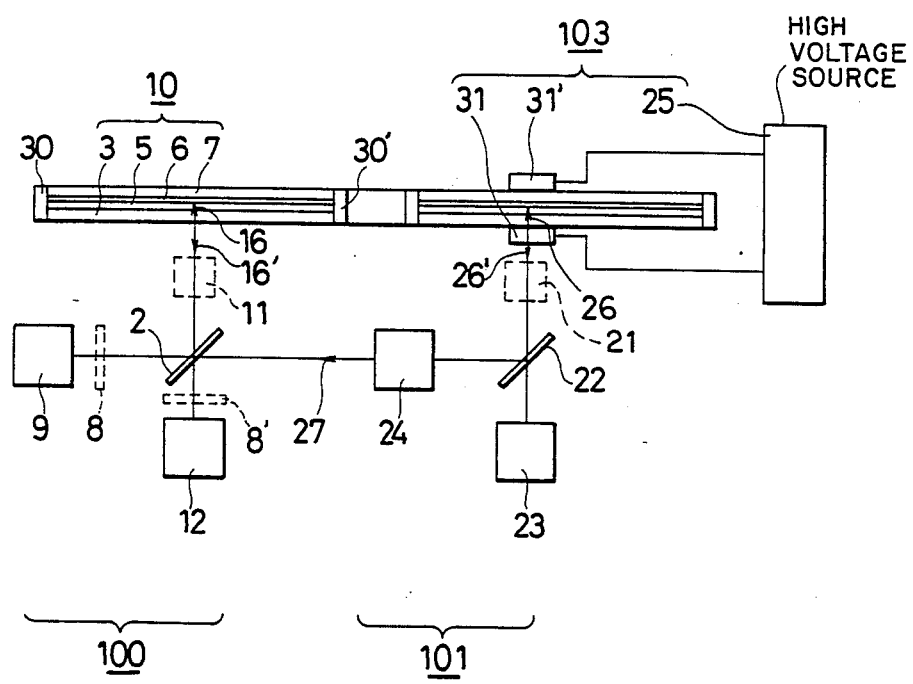
FIG. 3 is a schematic illustration of a further embodiment of the invention.

Another embodiment is shown in FIG. 3. In the figure, the construction is the same as in the foregoing embodiment except for the electric field applying method, therefore redundant explanations are not repeated.

In this case, a voltage is applied, for the optical disc 10, directly to a pair of electrodes 31 and 31' from a high voltage source 25 on the outside, in order to impress a prescribed electric field on FLC. The electrodes 31 and 31' are proximately close to the optical disc 10. Although, in the figure, the electrode 31 and 31' have a length which is only a fraction of the radius of the disc, they may have a length equal to the radius. In the former case, electric power consumption is reduced. In the latter case, dispensed with is a means for radially scanning the disc 10 with the electrodes 31 and 31' from outside toward inside, or vice versa, of the disc 10, and it is possible to erase the entire surface of the disc with one rotation of the disc 10. According to this another embodiment, the optical disc 10 comprises the pair of electrodes 31 and 31', one of which is transmissive and other of which has reflective inside, and FLC between the substrates. In the figure a reflective plate 6 is provided on the glass plate 7. Although the reflective plate 6 must not be conductive, use of conductive plate makes it possible to place the electrode 31' apart from the disc.

Although only a few exemplary embodiments of this invention have been described in detail above, those skilled in the art will readily appreciate that many modifications are possible in the exemplary embodiments without materially departing from the novel teaching and advantages of this invention. For example, a polarizing plate 8' can be placed between the half-mirror 2 and the laser 12 instead of the plate 8. In this modification, the light incident on the disc is polarized in advance in favor of one of the bistate conditions.

What is claimed is:

1. A liquid crystal disk memory comprising:
   a pair of substrates having a central aperture to define inner and outer peripheries of the pair of substrates, at least one of said substrates being transparent;
   a chiral smectic liquid crystal contained in a space formed between said pair of substrates in which information can be written in terms of a binary code which is represented by two states of said liquid crystal, where, in one of said states, the molecules of said liquid crystal are oriented in a first direction which is parallel to said pair of substrates and, in the other state, the molecules of said liquid crystal are oriented in a second direction which is also parallel to said pair of substrates and which is at a predetermined angle with respect to the first direction in a plane parallel to the substrates;
   a sealing member provided on the inner and outer peripheries of said pair of substrates for sealing off the liquid crystal;
   a pair of electrodes provides on the inside surfaces of said pair of substrates for applying an electric field to said liquid crystal; and
   a pair of contacts provided on the inner periphery of said pair of substrates, said contacts being connected to said pair of electrodes respectively.

2. A liquid crystal disk memory for writing information in terms of a binary code on a plurality of memory domains, said memory comprising:
   a pair of substrates having a central aperture to define inner and outer peripheries of the pair of substrates, at least one of said substrates being transparent;
   a chiral smectic liquid crystal contained in a space formed between said pair of substrates in which information can be written in terms of a binary code which is represented by two states of said liquid crystal, where, in one of said states, the molecules of said liquid crystal are oriented in a first direction which is parallel to said pair of substrates and, in the other state, the molecules of said liquid crystal are oriented in second direction which is also parallel to said pair of substrates and which is at a predetermined angle with respect to the first direction in a plane parallel to the substrates;
   a sealing member provided on the inner and outer peripheries of said pair of substrates for sealing off the liquid crystal;
   a pair of electrodes provided on the inside surfaces of said pair of substrates for applying an electric field to said liquid crystal in order to switch the state of said liquid crystal in response to an applied electric field acting on dipole moments of the molecules said chiral smectic liquid crystal, each electrode extending and terminating in an outside contact at the inner periphery of said pair of substrates.

3. A liquid crystal disk memory comprising:
   a pair of substrates having a central aperture to define inner and outer peripheries of the pair of substrates, at least one of said substrates being transparent;
   a chiral smectic liquid crystal contained in a space formed between said pair of substrates in which information can be written in terms of a binary code which is represented by two states of said liquid crystal, where, in one of said states, the molecules of said liquid crystal are oriented in a first direction which is parallel to said pair of substrates and, in the other state, the molecules of said liquid crystal are oriented in a second direction which is also parallel to said pair of substrates and which is at a predetermined angle with respect to the first direction in a plane parallel to the substrates;
   a sealing member provided on the inner and outer peripheries of said pair of substrates for sealing off the liquid crystal; and
   a pair of electrodes disposed intermediate the sealing members and adjacent the opposite exterior surfaces of the disk memory for applying an electric field to said liquid crystal.

* * * * *